United States Patent [19]

Shessel et al.

[11] Patent Number: 5,690,482
[45] Date of Patent: Nov. 25, 1997

[54] PROCESS FOR THE COMBUSTION OF SULPHUR CONTAINING FUELS

[75] Inventors: Gerry Shessel, North York; Norman James MacGregor, Kingcardine, both of Canada

[73] Assignee: Integrated Energy Development Corp., Kingcardine, Canada

[21] Appl. No.: 336,113

[22] Filed: Nov. 4, 1994

[51] Int. Cl.$^6$ ........................................ F23B 1/00
[52] U.S. Cl. .................... 431/2; 431/4; 431/5; 431/10; 431/11; 431/12
[58] Field of Search .................. 431/2, 4, 5, 10, 431/12, 11

[56] References Cited

U.S. PATENT DOCUMENTS

| | | |
|---|---|---|
| 2,482,284 | 9/1949 | Michael et al. . |
| 3,926,784 | 12/1975 | Christman et al. ............ 208/210 |
| 3,990,229 | 11/1976 | Staege . |
| 4,099,383 | 7/1978 | Paull et al. . |
| 4,235,800 | 11/1980 | Pinto ............................ 260/449.5 |
| 4,406,610 | 9/1983 | Duijvestijn .......................... 431/4 |
| 4,545,879 | 10/1985 | Wan et al. ....................... 204/158 R |
| 4,592,762 | 6/1986 | Babu et al. . |
| 4,697,413 | 10/1987 | Pohl . |
| 4,699,632 | 10/1987 | Babu et al. . |
| 4,810,417 | 3/1989 | Diemer et al. . |
| 4,833,170 | 5/1989 | Agee . |
| 4,917,024 | 4/1990 | Marten et al. . |
| 5,132,007 | 7/1992 | Meyer et al. . |
| 5,169,612 | 12/1992 | Nielsen ............................. 423/230 |
| 5,345,756 | 9/1994 | Jahnke et al. . |
| 5,416,245 | 5/1995 | MacGregor et al. ............... 568/697 |

FOREIGN PATENT DOCUMENTS

| | | |
|---|---|---|
| 0185841 | 2/1986 | European Pat. Off. . |
| 24 29 993 | 8/1976 | Germany . |
| 29 48 389 | 1/1981 | Germany . |
| 34 14 140 | 10/1985 | Germany . |

OTHER PUBLICATIONS

Chemichal Process Industries, R. Norris Shreve, McGraw–Hill Book Company, 1967, pp. 324–325.
Petroleum Processing handbook, William F. Bland and Robert L. Davidson, McGraw–Hill Book Company 1967, pp. 3–131 to 3–136, 6–7.
Wherever Carbon Monoxidie is required . . . .
Air Polution Engineering Manual; John A. Danielson, May 1973, pp. 568–570, 722–734.

*Primary Examiner*—Larry Jones
*Attorney, Agent, or Firm*—Bereskin & Parr; Philip C. Mendes da Costa

[57] ABSTRACT

A process for producing energy from sulphur containing carbonaceous fuels comprises partially oxidizing the carbonaceous fuel to produce off gasses including carbon monoxide, hydrogen and hydrogen sulphide; removing hydrogen sulphide from the off gasses and combusting the off gasses from which the hydrogen sulphide has been removed to produce energy.

24 Claims, 5 Drawing Sheets

PROCESS FOR THE COMBUSTION OF SULPHUR CONTAINING FUELS

FIELD OF THE INVENTION

This invention relates to the method of combusting sulphur containing fuels to produce energy whereby sulphur emissions from the combustion process are reduced. In particular, the invention relates to a two-step combustion process wherein sulphurous compounds are removed at an intermediate point between the two combustion steps.

BACKGROUND TO THE INVENTION

Energy, in a variety of forms, including mechanical energy, electricity and heat, are obtained by the combustion of carbonaceous fuels. Some fuels are undesirable because they have a low heating value. Other fuels are undesirable due to the presence of contaminates. During the combustion process these contaminates produce undesirable elements and compounds which, due to current environmental standards, must be removed to a greater or lesser extent, prior to venting the combustion gasses to the atmosphere.

For example, petroleum, coal and other fuels sometimes contain large percentages of sulphur and other elements. During combustion, the sulphur in the fuel is oxidized to produce sulphur dioxide and possibly minor amounts of sulphur trioxide. These sulphurous compounds are entrained in the exhaust gas stream from the combustor and comprise a major component of the noxious emissions from the combustor. The sulphur oxides are considered to be significant environmental hazards.

In many jurisdictions, laws have been passed limiting the amount of sulphurous compounds which may be emitted. Accordingly, it has become necessary in various cases to scrub exhaust gasses to remove the sulphurous compounds. Various technologies have been developed to remove sulphur oxides from exhaust gas streams, including dry and wet absorption and absorption and catalytic oxidation.

Typically the composition of the flue gases from heavy oil fired appliances (by volume) is approximately:

| | |
|---|---|
| sulphur dioxide | 0.1% |
| carbon dioxide | 12.5% |
| water | 8.8% |
| nitrogen | 75.3% |
| excess oxygen | 3.3% |

Sulphur dioxide is a minor constituent which is diluted in the flue gas. Due to its environmentally deleterious nature, legislative restrictions and social policy increasingly require that sulphur dioxide be removed from exhaust gas streams.

Due to the very large volumes of exhaust gases which are produced by oil fired appliances, pollution control equipment is typically large and expensive. The expense is due to the large size of the equipment, the high energy input which is typically required and the material from which the equipment must be constructed due to the high temperatures and corrosive nature of the constituents which are entrained in the exhaust gas. In addition, the efficiencies of these techniques are low resulting in a product gas which remains acidic.

SUMMARY OF THE INVENTION

In accordance with the instant invention, there is provided a process for producing energy from sulphur containing carbonaceous fuels comprising the steps of:

(a) partially oxidizing the carbonaceous fuel to produce off gasses, including carbon monoxide, hydrogen and hydrogen sulphide;
(b) removing hydrogen sulphide from said off gasses; and
(c) combusting the off gasses from step (b) to produce energy.

This process is particularly applicable to carbonaceous fuels that have a sufficient amount of sulphur which, if combusted in the typical manner, would produce a concentration of sulphur oxide compounds which would have to be at least partially removed from the exhaust gasses. The carbonaceous fuel may comprise at least about 0.5 wt % sulphur and may comprise more than about 1.5 wt % sulphur.

The partial oxidation reaction is conducted with less than the stoichiometric amount of oxygen required to completely combust the fuel. Preferably, the amount of oxygen present during the partial oxidation reaction is sufficient to produce an off gas stream principally comprising carbon monoxide, hydrogen and hydrogen sulphide with only minor amounts of carbon dioxide. Preferably, the off gasses will include only about 10 wt % carbon dioxide, more preferably about 5 wt % and, most preferably, only about 2 wt % carbon dioxide. The partial oxidation reaction may be conducted with from about −10% to about +5% of the stoichiometric amount of oxygen required to convert the carbonaceous fuel to carbon monoxide and, preferably, an excess stoichiometric amount of oxygen required to convert the carbonaceous fuel to carbon monoxide is utilized.

The oxygen used in the partial oxidation reaction may be present as an air feed stream to the reactor. Alternately, an enriched air stream containing about 85 wt % oxygen, more preferably about 95 wt % oxygen and, most preferably, about 100 wt % oxygen may be utilized. In a further alternate embodiment, a stream of substantially pure oxygen may be fed to the partial oxidation reactor.

The partial oxidation reaction may be conducted at a pressure from about 10 to about 40 bars, more preferably from about 10 to about 30 bars, and most preferably from about 20 to 30 bars. The temperature of the reaction may be from about 1,200° to about 1,700° C., more preferably from about 1,300° to about 1,650° C. and, most preferably, from about 1,350° to about 1,600° C.

The off gasses, with the hydrogen sulphide removed, are combusted in a reactor. Any type of reactor suitable for the combustion of the off gasses may be utilized. The reactor may be a gas turbine which produces mechanical energy that may be converted to electricity. The stack gasses from the reactor may be fed to a waste heat recovery boiler to produce steam. Alternately, the reactor may be a boiler which would produce steam and the stack gasses from the boiler could be fed to a waste heat recovery air or water heater or elsewhere for process heating.

In one embodiment, the partial oxidation reactor may be cooled by water or by carbon dioxide withdrawn from the stack gasses from the combustion of the off gasses from the partial oxidation reactor. The carbon dioxide would then be heated and some of the gas may be fed back into the partial oxidation reactor. Alternately, if water is utilized as the cooling medium, the heated water may be used to produce steam which may be used for heating purposes, for process steam or to generate electricity such as by expanding the steam through a turbine.

Accordingly, one advantage of the instant invention is that the sulphur containing carbonaceous fuel may be fully combusted with a reduced amount of sulphur species being exhausted from the process. Depending upon the efficiency of the hydrogen sulphide removal process, the stack gasses may contain only negligible amounts of sulphur species (on the order of about 5 ppm or less). All of this is achieved without a significant reduction in the energy derived from the combustion of the fuel. In particular, in one embodiment, energy, in the form of steam or otherwise, may be obtained directly from both the partial oxidation reactor and the combustion of the cleaned off gasses.

According to a further embodiment, the cleaned off gasses may be subjected to gas separation to remove one or more of hydrogen, carbon monoxide and carbon dioxide. These isolated streams would provide valuable products for sale or as a feed material for other areas in a plant. Thus, in addition to combusting a sulphur containing organic carbonaceous fuel, valuable by-products, such as hydrogen, may be obtained.

BRIEF DESCRIPTION OF THE DRAWINGS

The substance and advantages of the instant invention will be more fully and completely understood by reference to the following drawings of a preferred embodiment of this invention in which.

DESCRIPTION OF THE PREFERRED EMBODIMENT

Figure 1:
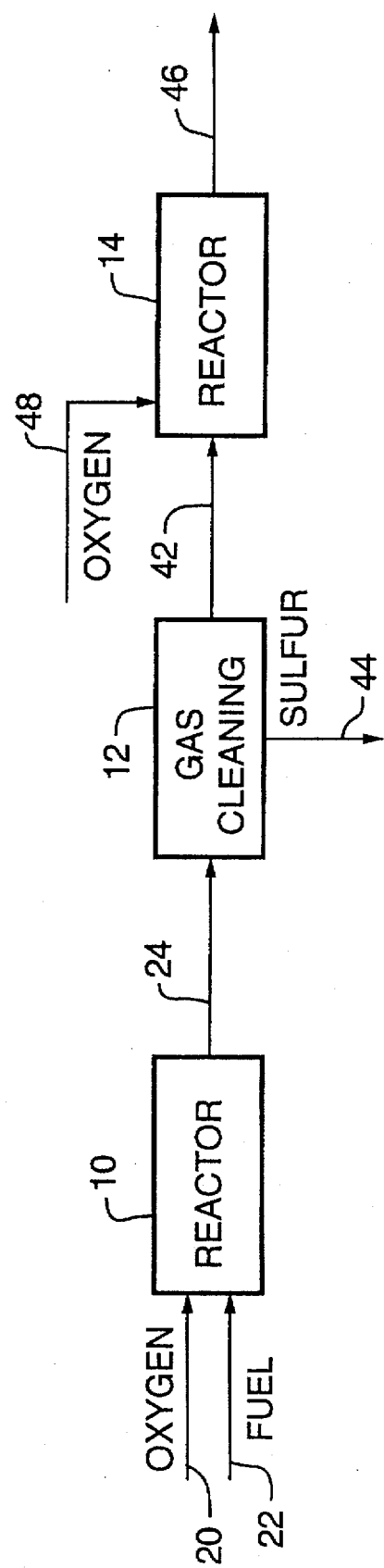
FIG. 1 is a schematic view of the process according to the instant invention.

Referring to FIG. 1, the process of the instant invention comprises a partial oxidation reactor 10, gas stripper 12 and combustion reactor 14.

Oxygen stream 20 and carbonaceous fuel stream 22 are fed to reactor 10. The fuel may be any carbonaceous fuel which contains sulphur. The carbonaceous fuel may be any organic matter that has sufficient heating value to make it desirable to be used as a fuel. The fuel will comprise a concentration of sulphur whereby cleaning of the stack gasses is either required by law or desirable in view of the amount of sulphur oxides which are emitted upon regular combustion of the fuel. For example, the process may be used with a light weight fuel, such as No. 2 fuel oil, which may contain about 0.5 wt % sulphur or more. The process may also be used on heavier fuels, such as tower bottoms, which may contain about 1.5 wt % or more sulphur. Currently, the sulphur content of fuels may be up to about 7 wt %. Accordingly, the process may be used on fuels having from about 0.5 to about 7 wt % sulphur or even from about 1.5 to about 7 wt % sulphur. Fuels containing greater than 7 wt % sulphur may be utilized, provided that gas stripper 12 is appropriately designed to handle the removal of such high concentrations of sulphur.

The fuel may be a solid, liquid or gas. Exemplary of solid fuels are high sulphur containing coals, such as brown coal. Exemplary of liquid fuels are heavy oils, such as those which may be used in industrial boilers or, in fact, raw petroleum which may be combusted at an oil field to produce steam for the oil recovery process. Exemplary gasses include gaseous by-products of industrial processes which have a high level of sulphur and heating value such as coke oven gas or steel converter gas.

The fuel may also have various other contaminates, such as vanadium or other heavy elements. During the partial oxidation reaction, vanadium and other heavy elements tend to form oxides, such as vanadium pentoxide. These oxides tend to be soluble in acids and can be removed from the off gasses from reactor 10 by an acid solvent wash with solvent recovery.

Oxygen stream 20 may comprise any stream which will provide sufficient oxygen to the partial oxidation reactor. For example, stream 20 may comprise air, pure oxygen, or oxygen enriched air. Preferably, oxygen enriched air is used. For example, stream 20 may comprise more than 85 wt % oxygen, preferably, more than about 95 wt % oxygen and, most preferably, about 100 wt % oxygen. The oxygen utilized to enrich stream 20 may be obtained from electrolysis or air separation techniques. The electrolysis may be powered, at least in part, by electricity produced from the combustion reactor 14 as discussed below.

Partial oxidation reactor 10 reacts fuel with oxygen to produce off gas stream 24. This stream contains partial combustion products which substantially comprise carbon monoxide and hydrogen, together with lesser amounts of carbon dioxide, water, hydrogen sulphide, nitrogen and elemental contaminants in the fuel, oxides of the elemental contaminants in the fuel or other compounds derived from the contaminants in the fuel. For example, if oxygen stream 20 comprises substantially pure oxygen, the carbon monoxide and hydrogen will typically comprise from about 90 to about 95 wt % of off gas stream 24.

The partial oxidation reaction converts the organic compounds in the fuel to carbon monoxide and hydrogen. The sulphur in the fuel reacts with hydrogen which is liberated during the partial oxidation of the fuel to form hydrogen sulphide. Accordingly, to permit complete conversion, or substantially complete conversion, of the sulphur to hydrogen sulphide, a sufficient amount of hydrogen must be produced during the partial oxidation reaction. This in turn requires that the amount of oxygen present in partial oxidation reactor 10 is sufficient to drive the oxidation of carbon in the fuel to carbon monoxide to completion and insufficient to permit all of the carbon in the fuel to react to produce carbon dioxide. If the oxidation reaction is allowed to proceed too far to completion (i.e. to the production of carbon dioxide and water), then insufficient hydrogen will be present to convert the sulphur to hydrogen sulphide.

Preferably, the amount of oxygen present in oxygen stream 22 will be from about −10 to about +5 wt %, more preferably from about −5 to about +5 wt % and, more preferably, from about 0 to about +5 wt % of the stoichiometric amount of oxygen required to convert the carbonaceous fuel to carbon monoxide. If less than the theoretical amount of oxygen required to convert the carbonaceous fuel to carbon monoxide is utilized, then soot will be produced. The soot may be removed by high energy scrubbing of the off gasses 24 after cooling. The soot may then be recycled to the reactor (not shown). More preferably, the amount of oxygen which is utilized is sufficient to prevent soot formation and insufficient to allow complete combustion.

Reactor 10 may be any partial oxidation reactor. The partial oxidation reactor may be a long, vertically extending tube which is lined with a refractory material. The fuel is fed into the top of the reactor and reacts as it travels downwardly through the reactor. For example, if the fuel is a solid, the solid fuel may be finely divided and injected into the top of the reactor. In the case of a liquid, the fuel may be atomized and injected into the top of the reactor.

The reaction may occur at any partial oxidation reaction conditions. Preferably, the reaction occurs at a pressure from about 10 to about 40 bars, more preferably from about 10 to 30 bars and, most preferably, from about 20 to about 30 bars. The temperature may be from about 1,200° to about 1,700° C., more preferably from about 1,300° to about 1,650° C. and, most preferably, from about 1,350° to about 1,600° C.

Figure 5:
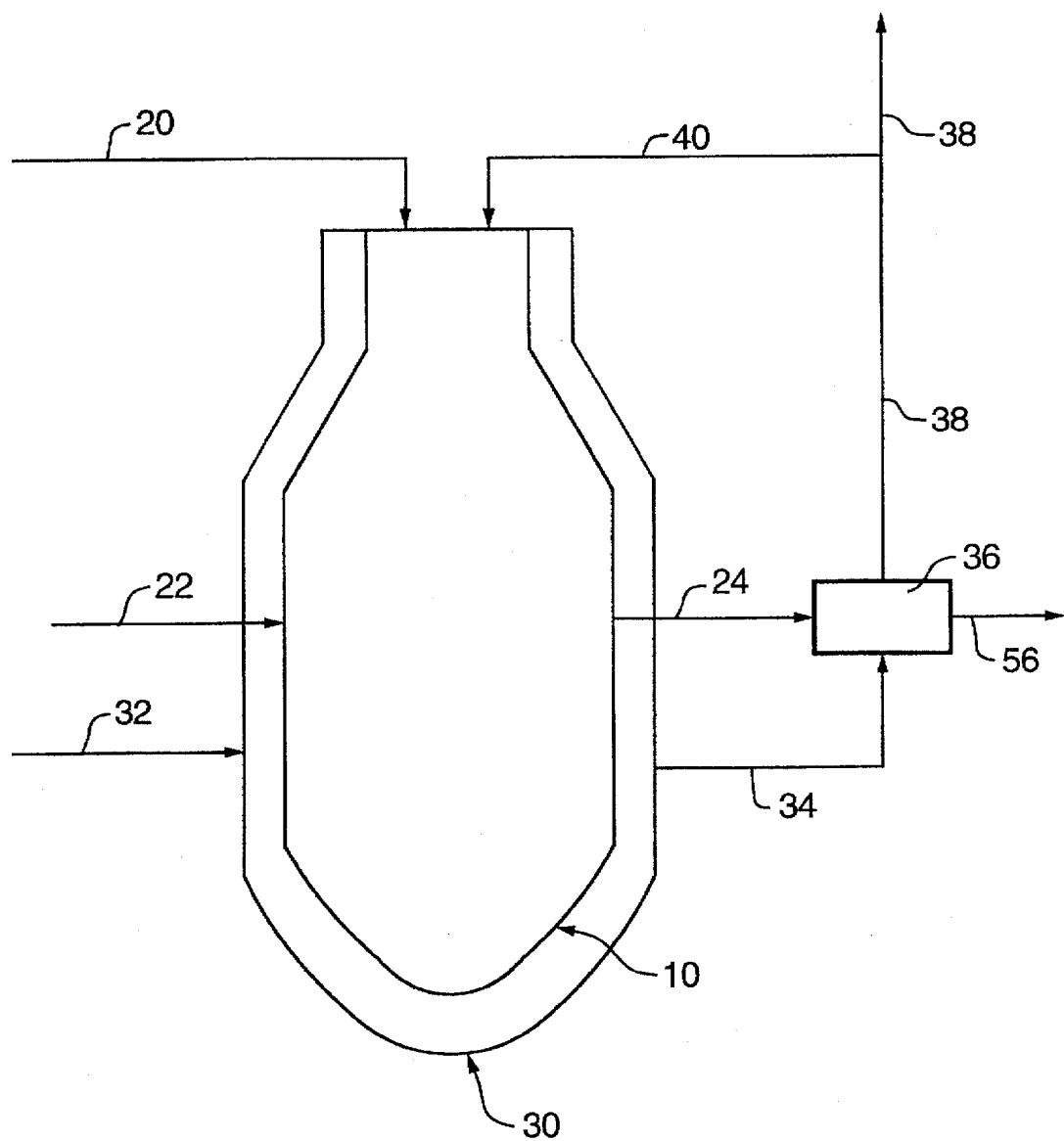

Partial oxidation reactor 10 is preferably cooled. This may be accomplished by providing a cooling jacket. For example, as shown in FIG. 5, partial oxidation reactor 10 is provided with cooling jacket 30. Cooling fluid is provided to cooling jacket 30 by a feed stream 32. The cooling fluid is heated as it passes through cooling jacket 30 to an elevated temperature. The heated fluid exits cooling jacket 30 via stream 34. In one embodiment, shown in FIG. 5, stream 34 may be further heated by passing stream 34 through indirect heat exchanger 36. Off gas stream 24 is also fed to indirect heat exchanger 36. During its passage through heat exchanger 36, the fluid in the cooling stream is further heated and gaseous stream 24 is cooled. In an alternate embodiment (not shown), stream 34 may be fed directly to further process steps such as feeding stream 34 to a heat recovery boiler to produce steam or itself may be used to directly produce energy.

The cooling fluid in stream 32 may be water. Accordingly, stream 34 may comprise process steam which may be used elsewhere in the plant. Alternately, stream 34 may be used for heating purposes, for process steam or to produce mechanical energy or electricity by passing the steam through a turbine (not shown). By passing stream 34 through heat exchanger 36, stream 38, comprising water/steam at an even higher temperature or pressure may be obtained.

Alternately, the cooling fluid in stream 32 may be carbon dioxide. The carbon dioxide may be a by-product of this process or may be excess carbon dioxide produced on or off site. The carbon dioxide is then heated as it passes through cooling jacket 32 and, optionally, heat exchanger 36. By this process, the carbon dioxide may be heated to or above the dissociation temperature of carbon dioxide (above about 1,200° C. and, more preferably, above about 1,500° C.). At this temperature, carbon dioxide dissociates to produce carbon monoxide and oxygen. Accordingly, a branch 40 may be taken from stream 38 and fed into partial oxidation reactor 10 as an additional source of oxygen and carbon monoxide. By this process, carbon dioxide from a source internal or external to the plant may be converted to carbon monoxide and oxygen using available heat from the partial oxidation reactor.

Off gas stream 24 is sent to stripper 12 for the removal of sulphurous compounds. Preferably, the partial oxidation reaction has been conducted to produce hydrogen sulphide. However, other sulphurous compounds may be present depending upon the process conditions and the other elements which may be present in feed streams 20 and 22.

Stripper 12 represents any process which may be utilized to remove hydrogen sulphide, or other sulphurous compounds, or other contaminates from off gas stream 24. For example, hydrogen sulphide may be removed from off gas stream 24 by an amine absorption process which may be followed by a Claus type process to yield bricks of elemental sulphur; a convenient and environmentally safe form. If it is desired to remove heavy metal oxides, such as vanadium pentoxide, then an acid wash with solvent recovery may also be utilized.

Stripper 12 produces hydrogen sulphide deficient stream 42 and sulphur rich stream 44. Hydrogen sulphide deficient stream 42 is sent to reactor 14 for further combustion. Sulphur rich stream 44 may contain elemental sulphur. If this stream comprises elemental sulphur, then it may be used as a feed material in another part of the plant or may be stored for sale.

The amount of hydrogen sulphide, and other contaminates, removed from off gas stream 24 will vary depending upon the degree of removal which is desired. Preferably, at least a sufficient amount of hydrogen sulphide is removed so as to avoid the need for scrubbing the stack gasses to remove sulphur oxide compounds. As this process allows valuable products, such as elemental sulphur, to be produced, it is preferred to achieve a relatively high degree of hydrogen sulphide removal from off gas stream 24. For example, hydrogen sulphide deficient stream 42 may contain as low as about 5 ppm by weight of hydrogen sulphide. Thus, effectively complete removal of the sulphur from the sulphurous fuel may be achieved.

As shown in FIG. 1, hydrogen sulphide deficient stream 42 is fed to reactor 14 where it is combusted to produce stack gasses 46. Oxygen feed stream 48 is also fed to reactor 14. Oxygen feed stream 48 comprises air, oxygen enriched air, oxygen or a mixture thereof. In order to obtain complete combustion of hydrogen sulphide deficient stream 42, at least a stoichiometric amount of oxygen is present in reactor 14 and, preferably, a stoichiometric excess amount of oxygen is present. Depending upon the oxygen content of stream 42, all, or maybe just some, of the required oxygen may be provided through stream 48.

Figure 2:
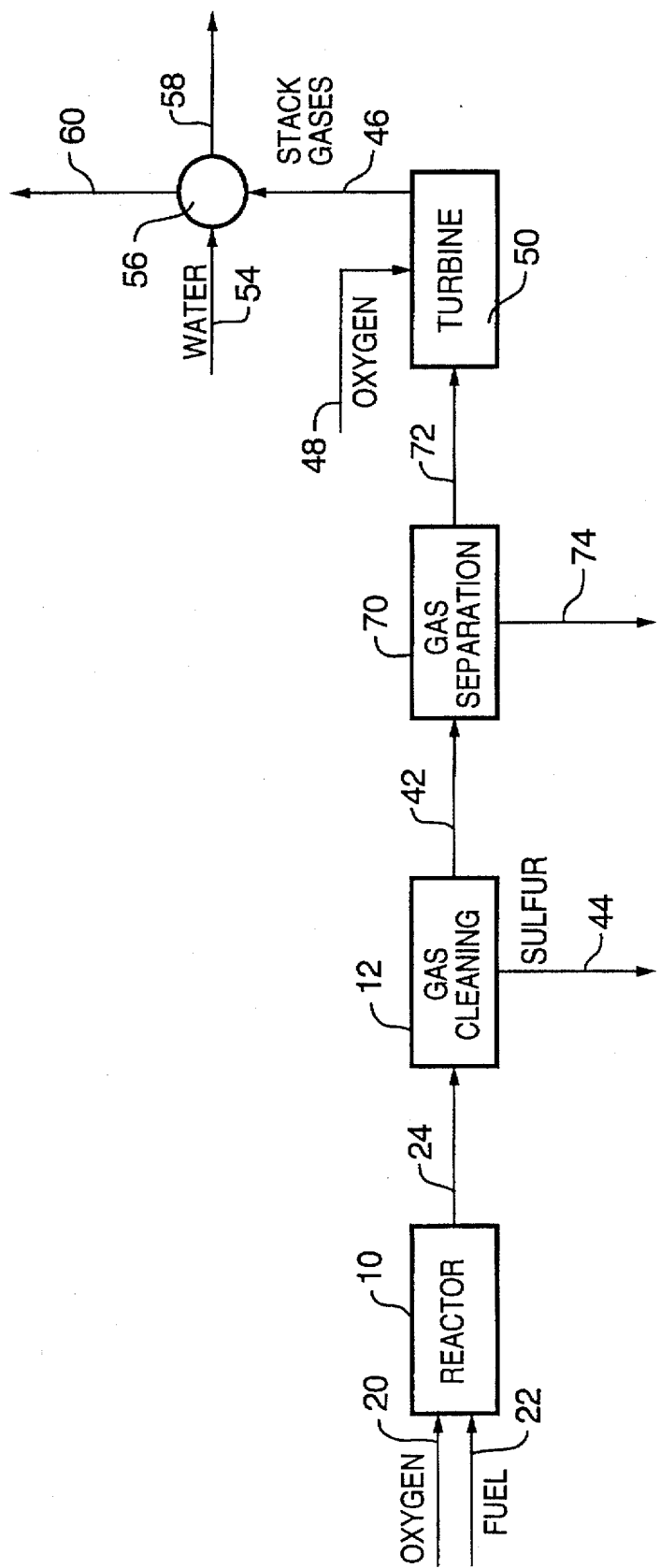
FIG. 2 is a schematic view of an alternate process according to the instant invention.
Figure 3:
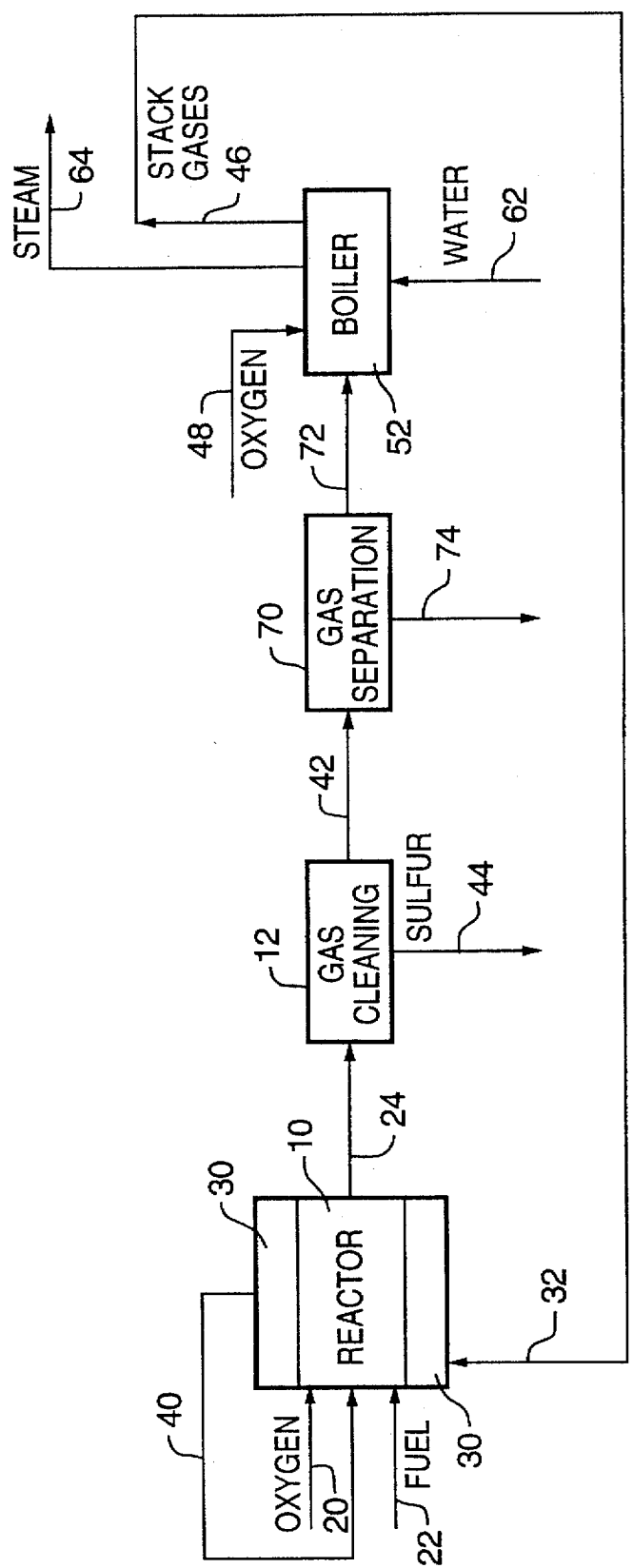
FIG. 3 is a schematic view of a further process according to the instant invention.

Reactor 14 may be any reactor which will combust stream 42 to produce energy. For example, as shown in FIG. 2, reactor 14 may comprise turbine 50 or, as shown in FIG. 3, boiler 52. If a turbine is utilized, then the combustion of the gas will produce mechanical energy which may be converted to electricity by known techniques. Alternatively, if a boiler is utilized, then combustion of the gas will produce steam which may be used as process steam in the plant, steam for heating purposes in the plant, electricity bypassing the steam through a turbine or like device or a combination thereof.

In total, reactors 10 and 14 in combination completely combust fuel 22 to produce energy which may be in the form of mechanical energy, heat or electrical energy. However, since the complete combustion of fuel 22 has occurred in two steps, namely a partial oxidation reaction followed by a final combustion reaction in reactor 14, partial oxidation products are obtained. Hydrogen sulphide and optionally other compounds may be removed from the product gasses of the partial oxidation reactor by simple, low cost techniques thus permitting a high sulphur fuel to be combusted without the need of expensive pollution control equipment. In effect, by using the process of the instant invention, a relatively low value sulphur containing fuel can be utilized in a combustion process which typically has required higher value fuels.

In the embodiment set out in FIG. 2, stack gasses 46 from turbine 50 are fed to waste heat recovery boiler 56. Boiler feed water is fed via stream 54 to waste heat recovery boiler 56. Waste heat recovery boiler 56 produces steam 58 and cooled stack gasses 60. Steam 58 may be used as process steam in the plant, used for its heating value, fed to a steam turbine to produce electricity or a combination thereof.

Stream 60 will substantially comprise carbon dioxide and water. Optionally, at least a portion of the carbon dioxide may be removed from stream 60. This carbon dioxide may then be fed to cooling jacket 30 via stream 32 as discussed above. Alternately, the carbon dioxide may be used as a feed stock elsewhere in the plant, such as in the production of methanol, or stored and sold as a commodity.

In an alternate embodiment, as shown in FIG. 3, the combustion gasses are fed to boiler 52. Boiler feed water is fed to boiler 52 via stream 62. The completion of the combustion of fuel 22 in boiler 52 results in the production of steam 64. Once again, as discussed above, steam 64 may be used to produce electricity by powering a steam turbine and generator, used as process steam or used for its heating value. The turbine produces electricity by driving a generator and the steam, after being passed through the turbine, may also be used for its heating value or may be cooled and recycled as boiler feed water.

Figure 4:
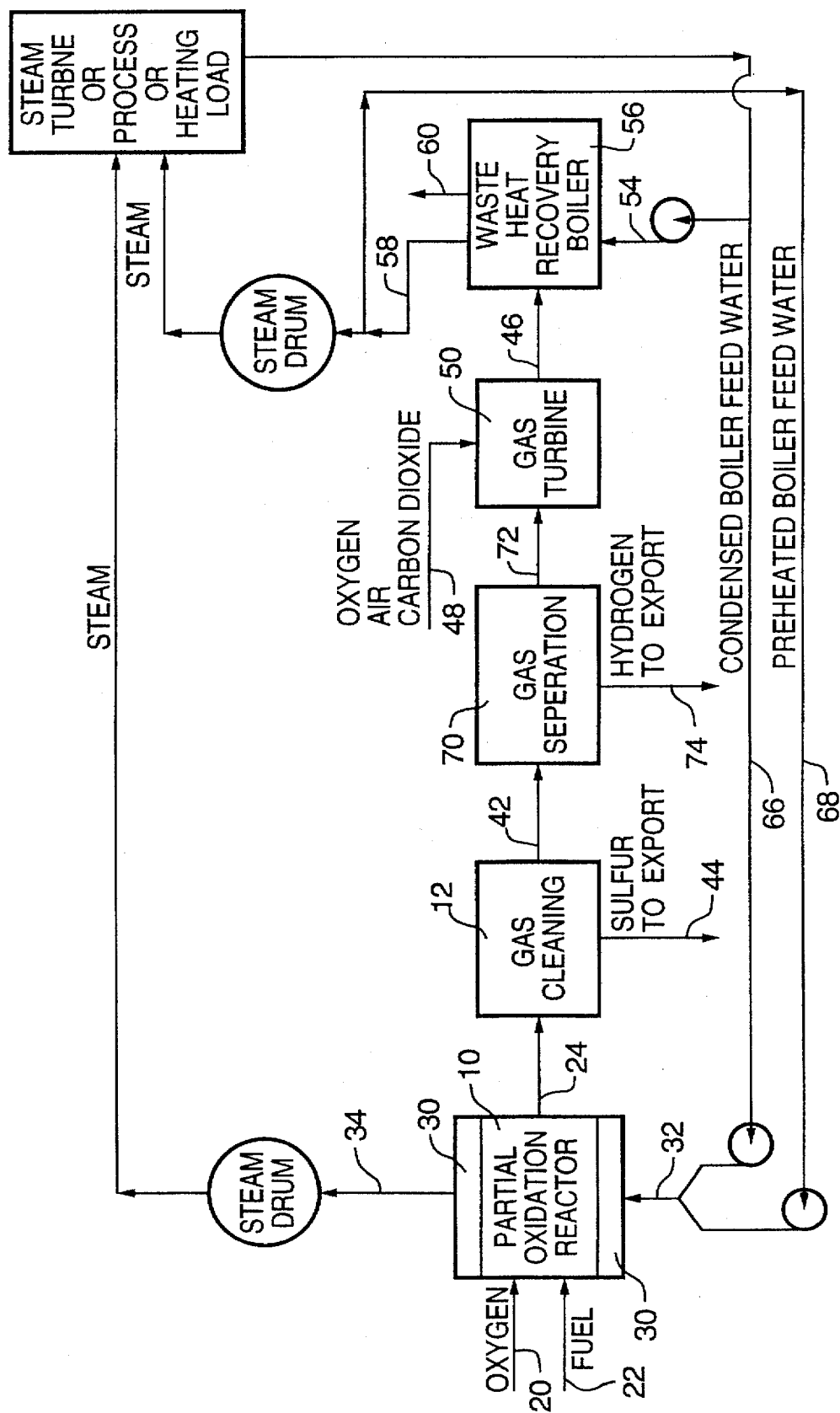
FIG. 4 is a schematic view of a further alternate embodiment of the process of the instant invention; and, FIG. 5 is a schematic cross-section of a partial oxidation reactor according to one embodiment of the instant invention.

If water is fed to cooling jacket 30 via stream 32, then the quantity of the steam in stream 34 can be varied depending upon the characteristics of the water fed to cooling jacket 32. For example, as shown in FIG. 4, condensed boiler feed water 66 could be fed to cooling jacket 30. The condensed boiler feed water may be from steam that has travelled through a steam turbine and has been cooled and condensed, excess process steam which has been cooled and condensed or steam which has been used for heating purposes and has been cooled and condensed. Alternately, preheated boiler feed water may be fed by process stream 68 to cooling jacket 30. The preheated boiler feed water may be obtained from stream 58 as it exits waste heat recovery boiler 56. In this case, the stream fed to cooling Jacket 30 would be at a higher temperature and/or pressure. Thus, a larger quantity of steam would be obtained in stream 34 than if condensed boiler feed water 66 were fed to cooling jacket 30. Switching means may be provided on the feed line to cooling Jacket 30 so as to switch between preheated boiler feed water 68 and condensed boiler feed water 66 as may be desired depending on the quantity of the steam required at a particular time.

In an alternate embodiment, as shown in FIGS. 2, 3 and 4, hydrogen sulphide deficient stream 42 may be optionally fed to gas separation unit 70 to produce off gas stream 72 and separated gas stream 74. If the hydrogen and carbon monoxide are separated, then there may be two streams 74—one for the carbon monoxide and one for the hydrogen. Hydrogen sulphide deficient stream 42 contains substantial quantities of carbon monoxide and hydrogen. Depending upon the degree of oxidation occurring in partial oxidation reactor 10, stream 42 may also contain varying amounts of carbon dioxide. Accordingly, one or more of these gasses may be separated from the stream 42 by gas separation unit 70.

Various techniques may be utilized to separate one or more of these gasses. For example, carbon monoxide may be separated from stream 42 by cryogenic separation or by reversible complex formation techniques. One cryogenic separation technique is the partial condensation process whereby feed stream 42 is cooled to liquify the carbon monoxide and then separated from hydrogen. The cooling may occur by first passing stream 42 through a heat exchanger to cool it and then against liquid methane. Subsequently, carbon monoxide and methane are condensed and separated as liquid in a warm separator. The liquid is then flashed to remove dissolved hydrogen and yields a gaseous carbon monoxide product after evaporation (not shown). A second example of a cryogenic separation process is the methane wash process. According to this process, feed gas 42 may be fed to a methane wash column. The gas is cooled to about 90° K. prior to being fed to the methane wash column. The gas phase, after counter-current scrubbing with refluxed liquid methane, is collected overhead as hydrogen gas containing minor levels of carbon monoxide and from about 1 to about 1.5% methane. The final processing produces a hydrogen stream and a carbon monoxide stream (not shown). These processes require that the gasses which are fed to the process are free of water and carbon dioxide.

The reversible complex formation process, the COSORB™ process, utilizes cuprous aluminum chloride in an aromatic solvent (such as toluene). The cuprous aluminum chloride forms a complex with the carbon monoxide. The complex formation may then be reversed to obtain relatively pure carbon monoxide.

If stream 74 having lower purities of gasses (for example from about 50 to about 95 volume percent of carbon monoxide) are acceptable, then membrane permeation technology or adsorbent technology may be utilized.

Accordingly, streams of relatively pure hydrogen and/or carbon monoxide may be obtained using these techniques. Off gas stream 72 may contain widely varying relative concentrations of carbon monoxide and hydrogen without hindering its use as a fuel in reactor 14. The amount of carbon monoxide and/or hydrogen which may be removed by streams 74 will vary depending on many factors, including the nature of fuel 22, the requirements of reactor 14 and the demand for carbon monoxide and hydrogen elsewhere in the plant or for export. The separated hydrogen may be used for upgrading heavy oil, desulphurizing petroleum and distilled fractions, hydrogenating vegetable oils, for the manufacture of alcohols or even elsewhere as a fuel. The separated carbon monoxide may be utilized as a fuel or as a feed stock to other processes, such as the manufacture of alcohols.

Depending upon the gas separation technique which is utilized, carbon dioxide may have to be removed prior to the separation of the carbon monoxide from the hydrogen (a further stream 74). Alternately, depending upon the quantity of carbon dioxide present in stream 42, it may be desirable to isolate the carbon dioxide. The isolated carbon dioxide may be used as a feed stock elsewhere in the plant, sold as a product or recycled to the partial oxidation reactor 10, either directly or by passing the carbon dioxide through cooling jacket 30.

We claim:

1. A process for producing energy from sulphur containing carbonaceous fuels comprising the steps of:
    (a) partially oxidizing the carbonaceous fuel at a pressure from about 10 to about 40 bars and a temperature from about 1,200° C. to about 1,700° C. to produce off gasses including carbon monoxide, hydrogen and hydrogen sulphide;
    (b) removing hydrogen sulphide from said off gasses; and,
    (c) combusting the off gasses from step (b) to produce energy.

2. The process as claimed in claim 1 wherein said carbonaceous fuel comprises at least about 0.5 wt % sulphur.

3. The process as claimed in claim 1 wherein said carbonaceous fuel comprises at least about 1.5 wt % sulphur.

4. The process as claimed in claim 1 wherein said partial oxidation reaction is conducted with from about −10% to about +5% of the stoichiometric amount of oxygen required to convert the carbonaceous fuel to carbon monoxide.

5. The process as claimed in claim 1 wherein said partial oxidation reaction is conducted with a stoichiometric excess amount of the oxygen required to convert the carbonaceous fuel to carbon monoxide.

6. The process as claimed in claim 1 wherein said partial oxidation reaction is conducted at a pressure from about 20 to about 30 bars and a temperature from about 1,300° C. to about 1,650° C.

7. The process as claimed in claim 1 wherein said partial oxidation reaction is conducted in the presence of oxygen enriched air.

8. A process for producing energy from a carbonaceous fuel containing at least about 0.5% sulphur by weight, said process comprising the steps of:

(a) introducing said carbonaceous fuel and oxygen into a partial oxidation reactor;

(b) subjecting said carbonaceous fuel to partial oxidation at a pressure from about 10 to about 40 bars and a temperature from about 1,200° C. to about 1,700° C. to produce a carbon monoxide, hydrogen and hydrogen sulphide rich off gas stream;

(c) removing hydrogen sulphide from said off gas stream to produce a hydrogen sulphide deficient stream; and, (d) combusting said hydrogen sulphide deficient stream to produce energy.

9. The process as claimed in claim 8 wherein said partial oxidation is conducted with from about −10% to about +5% of the stoichiometric amount of oxygen required to convert the carbonaceous fuel to carbon monoxide.

10. The process as claimed in claim 9 wherein said partial oxidation reaction is conducted in a partial oxidation reactor at a pressure from about 20 to about 30 bars and a temperature from about 1,300° C. to about 1,650° C.

11. The process as claimed in claim 10 wherein said oxygen comprises a stream of oxygen enriched air.

12. The process as claimed in claim 10 wherein one or more of hydrogen, carbon monoxide and carbon dioxide is separated from said hydrogen sulphide deficient stream prior to subjecting said hydrogen sulphide deficient stream to step (d).

13. The process as claimed in claim 10 wherein said hydrogen sulphide deficient stream is combusted in a boiler to produce steam and stack gasses.

14. The process as claimed in claim 13 wherein carbon dioxide is fed to said partial oxidation reactor.

15. The process as claimed in claim 13 wherein said carbon dioxide is used to cool said partial oxidation reactor and, subsequently, said carbon dioxide is fed to said partial oxidation reactor.

16. The process as claimed in claim 15 wherein said carbon dioxide is selected from the group consisting of carbon dioxide recovered from said stack gasses, carbon dioxide produced off-site or mixtures thereof.

17. The process as claimed in claim 16 wherein said stack gasses are fed to a boiler to produce steam.

18. The process as claimed in claim 10 wherein in step (d), said hydrogen sulphide deficient stream is combusted in a gas turbine to produce stack gasses.

19. The process as claimed in claim 18 wherein carbon dioxide is fed to said partial oxidation reactor.

20. The process as claimed in claim 19 wherein said carbon dioxide is used to cool said partial oxidation reactor and, subsequently, said carbon dioxide is fed to said partial oxidation reactor.

21. The process as claimed in claim 19 wherein said carbon dioxide is selected from the group consisting of carbon dioxide recovered from said stack gasses, carbon dioxide produced off-site or mixtures thereof.

22. The process as claimed in claim 8 wherein said partial oxidation is conducted with a stoichiometric excess amount of the oxygen required to convert the carbonaceous fuel to carbon monoxide.

23. The process as claimed in claim 8 further comprising the step of providing a feed stream of water to cool said partial oxidation reactor so as to elevate the temperature of said water and using said heated water to produce energy.

24. The process as claimed in claim 23 wherein said heated water is used to produce steam.

* * * * *